United States Patent [19]

Kim

[11] Patent Number: 5,707,311

[45] Date of Patent: Jan. 13, 1998

[54] STEPLESS SPEED CHANGING DEVICE

[75] Inventor: Euy Han Kim, Kyunggi-do, Rep. of Korea

[73] Assignee: LG Cable Co., Ltd., Seoul, Rep. of Korea

[21] Appl. No.: 650,924

[22] Filed: May 17, 1996

[30] Foreign Application Priority Data

Jan. 6, 1996 [KR] Rep. of Korea .................. 96-144

[51] Int. Cl.$^6$ .................................. F16H 37/02
[52] U.S. Cl. ...................... 425/214; 475/215; 475/216
[58] Field of Search ................. 74/665 G; 475/214, 475/215, 216, 217, 218, 219

[56] References Cited

U.S. PATENT DOCUMENTS

| | | | |
|---|---|---|---|
| 4,682,511 | 7/1987 | Wittke | 475/218 |
| 4,768,398 | 9/1988 | Greenwood | 475/216 |
| 4,913,002 | 4/1990 | Fellows | 475/216 |
| 5,074,830 | 12/1991 | Perry | 475/216 |
| 5,112,283 | 5/1992 | Miyata et al. | 475/218 |
| 5,263,907 | 11/1993 | Fellows | 476/40 |

FOREIGN PATENT DOCUMENTS

| | | |
|---|---|---|
| 63-43620 | 8/1988 | Japan. |
| PCT/GB90/ 01868 | 11/1990 | United Kingdom. |

*Primary Examiner*—Khoi Q. Ta
*Attorney, Agent, or Firm*—Darby & Darby

[57] ABSTRACT

A stepless speed changing device is disclosed. The device converts its operational mode between three or four modes thus reducing the load applied to both the summarizer and the speed changing unit. First and second gears are fixedly and rotatably fitted over a torque input shaft, respectively. The second gear is selectively clutched by a first clutch to convert the operational mode into a third mode. Third and fourth rotatable gears of a driven shaft are selectively clutched by a second clutch to convert the operational mode into a first mode. The summarizer constructed of an epicycloidal gear train cooperates with the fourth gear in the first and third modes. A sixth gear of the driven shaft is selectively clutched by a third clutch to convert the operational mode into a second mode. An eleventh gear of the driven shaft is selectively clutched by a fourth clutch to convert the operational mode into a fourth mode.

3 Claims, 1 Drawing Sheet

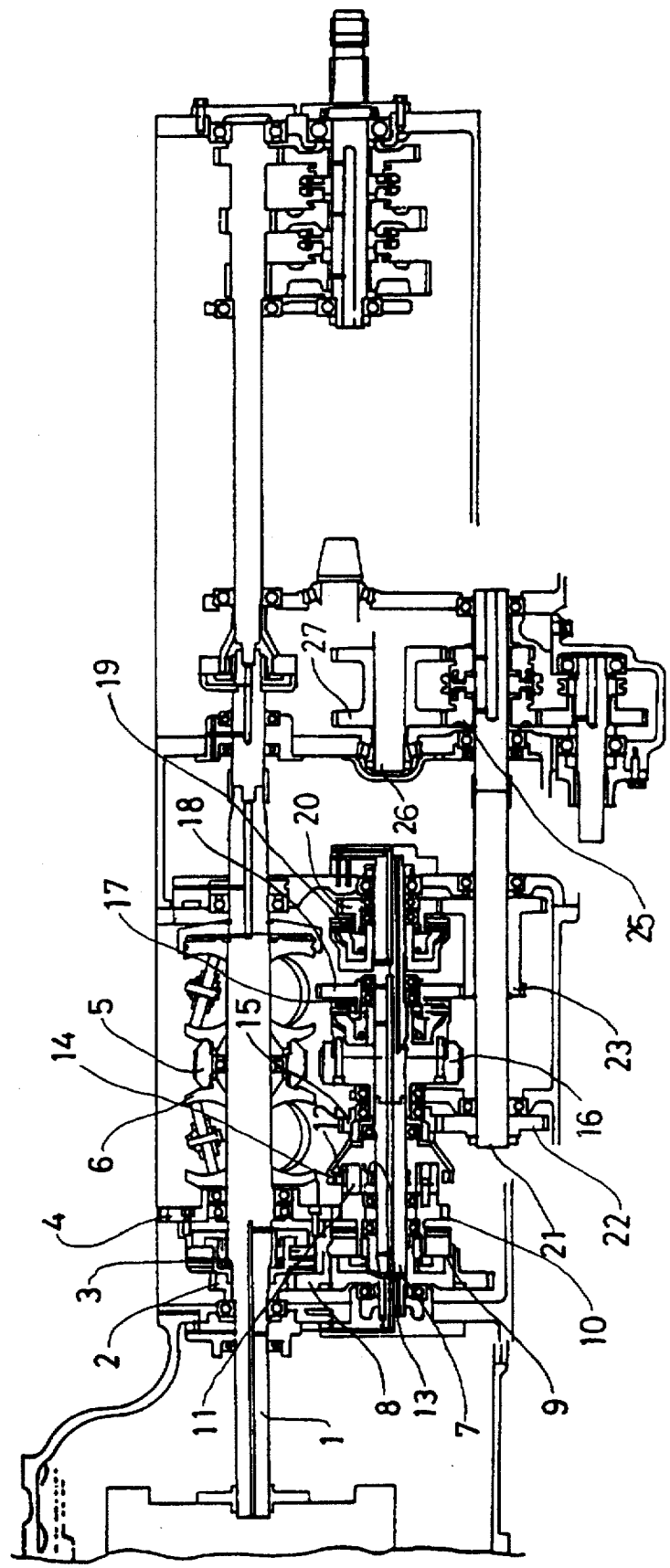

STEPLESS SPEED CHANGING DEVICE

BACKGROUND OF THE INVENTION

1. Field of the Invention

The present invention relates in general to stepless speed changing devices used for transmitting torque while changing the rotating speed within the full speed range without any intermission and, more particularly, to a structural improvement in such speed changing devices for reducing the load applied on both a stepless speed changing unit and a summarizer in the device thereby achieving the recent trend of being a compact speed changing device.

2. Description of the Prior Art

A typical stepless speed changing device used for transmitting torque while changing the rotating speed within full speed range without any intermission generally comprises two parts, that is, a stepless speed changing unit and a summarizer constructed of an epicycloidal gear train. The above speed changing device is operated in two modes to transmit input torque to an output shaft while changing the rotating speed.

That is, in a low speed mode for achieving either reverse or low speed forward driving mode, the torque of an input shaft is transmitted to an output shaft through the summarizer and stepless speed changing unit. The operational mode of the speed changing device is converted into the other mode or a high speed mode at the maximum speed condition in the above low speed mode. At the maximum speed condition in the low speed mode, the summarizer enters into a synchronous state where the ring gear of the summarizer's epicycloidal gear train rotates along with the shaft. The stepless speed changing unit in the above synchronous state enters into its maximum acceleration state. In the above state, the high speed clutch starts its clutching operation, while the low speed clutch stops its clutching operation. In the high speed mode, the stepless speed changing device thus increases the rotating speed exclusively by the speed increasing operation of the stepless speed changing unit while transmitting torque.

However, the above stepless speed changing device has the following problem as its operational mode is converted between two modes. When the speed changing device is continuously operated with a high load in the low speed mode, both the summarizer and the speed changing unit are overloaded. In this regard, the stepless speed changing device that is often continuously operated with a high load in the low speed mode must have a large enough size to resist the overload applied to both the summarizer and the speed changing unit, but this is almost impossible to design for practical use.

SUMMARY OF THE INVENTION

It is, therefore, an object of the present invention to provide a structurally improved stepless speed changing device in which the above problem can be overcome and which converts its operational mode between three or four modes thereby reducing the load applied to both the summarizer and the speed changing unit and achieving the recent trend of being a compact speed changing device.

In order to accomplish the above object, a stepless speed changing device according to an embodiment of this invention has first and second gears fixedly and rotatably fitted over a torque input shaft, respectively. The second gear is selectively clutched by a first clutch to convert the operational mode into a third mode. Third and fourth gears are rotatably fitted over a driven shaft and gear into the first and second gears respectively to form a pair of gear sets having different gear ratios. Both the third and fourth gears are selectively clutched by a second clutch to convert the operational mode into a first mode. A stepless speed changing unit is mounted to the input shaft and connected to a summarizer by power transmission means. The summarizer is mounted to the driven shaft and constructed of an epicycloidal gear train. The epicycloidal gear train includes a planetary gear carrier fixed to the fourth gear and carrying a planetary gear, a sun gear fixedly fitted over the driven shaft and gearing into the planetary gear, a ring gear gearing into the planetary gear, and a fifth gear rotatably fitted over the driven shaft and fixed to the ring gear. A sixth gear is rotatably fitted over the driven shaft. The sixth gear is selectively clutched by a third clutch to convert the operational mode into a second mode. The speed changing device also includes seventh, eight and ninth gears fixedly fitted over an intermediate shaft. The seventh and eight gears gear into the fifth and sixth gears of the driven shaft, respectively, while the ninth gear gears into a tenth gear of the output shaft.

The stepless speed changing device of this invention may further comprise an eleventh gear rotatably fitted over the driven shaft. The eleventh gear is selectively clutched by a fourth clutch to convert the operational mode into a fourth mode. In this case, a twelfth gear is fixedly fitted over the intermediate shaft and gears into the eleventh gear.

BRIEF DESCRIPTION OF THE DRAWING

The above and other objects, features and other advantages of the present invention will be more clearly understood from the following detailed description taken in conjunction with the accompanying drawing, showing the construction of a stepless speed changing device in accordance with a preferred embodiment of the present invention.

DESCRIPTION OF THE PREFERRED EMBODIMENTS

The accompanying drawing shows the construction of a stepless speed changing device in accordance with a preferred embodiment of the present invention.

A torque input shaft of the speed changing device according to this invention is designated 1 in the drawing. The input shaft 1 axially extends in the speed changing device. Fixedly fitted over one end portion of the above shaft 1 is a first gear 2. A second gear 4 is rotatably fitted over the input shaft 1 with a first clutch 3. The clutch 3 selectively clutches the second gear 4 to rotate the gear 4 along with the shaft 1. A stepless speed changing unit 6 with a first sprocket 5 is mounted to the input shaft 1 at a portion behind the third gear 4.

In the device, a driven shaft 7 extends under the above input shaft 1. The driven shaft 7 is spaced apart from and parallel to the input shaft 1. The above driven shaft 7 includes a third gear 8. The third gear 8 is rotatably fitted over one end portion of the shaft 7 and selectively gears into the first gear 2 of the input shaft 1 to form a first gear set. A fourth gear 10 with a second clutch 9 is rotatably fitted over the shaft 7. The above fourth gear 10 gears into the second gear 4 of the input shaft 1 to form a second gear set. The second clutch 9 selectively clutches the third and fourth gears 8 and 10. The speed changing device also includes a summarizer constructed of an epicycloidal gear train mounted to the driven shaft 7. In the summarizer, a planetary gear carrier 11 is fixed to the fourth gear 10. A planetary 12 is carried by the above gear carrier 11. The planetary gear 12 gears into a sun gear 13 fixedly fitted over the driven shaft 7. The planetary gear 12 also gears into a ring gear 14. A fifth gear 15 is rotatably fitted over the driven shaft 7 and fixed to one side of the ring gear 14. The fifth gear 15 thus rotates along with the ring gear 14. Fixedly fitted over the driven shaft 7 at a portion corresponding to the above first sprocket 5 is a second sprocket 16. The first and second sprockets 5 and 16 are connected together by a chain (not shown) thus forming a power transmission means for causing the unit 6 to cooperate with the summarizer. Of course, the power transmission means may be a gear train instead of the above chain and sprocket mechanism. The gear train as the power transmission means may comprise a pair of transmission gears fitted over the shafts 1 and 7 respectively. The above transmission gears are connected together with an idle gear gearing into the two gears, so the gears are rotated in the same direction. A sixth gear 20 with a third clutch 19 is rotatably fitted over the other end portion of the driven shaft 7. The third clutch 19 selectively clutches the sixth gear 20 to rotate the gear 20 along with the shaft 7.

An intermediate shaft 21 axially extends under the driven gear 7. The intermediate shaft 21 that is spaced apart from and parallel to the above driven gear 7 has a plurality of gears 22, 24 and 25. The above gears 22, 24 and 25 are fixedly fitted over the intermediate shaft 21. The seventh and eighth gears 22 and 24 gear into the fifth and sixth gears 15 and 20 of the driven shaft 7, respectively. The ninth gear 25 is fitted over the other end portion of the above shaft 21.

A torque output shaft 26 axially extends above the other end portion of the intermediate shaft 21. The above output shaft 26 is spaced apart from and parallel to the intermediate shaft 21. A tenth gear 27 is fixedly fitted over the output shaft 26. The gear 27 gears into the ninth gear 25 of the intermediate shaft 21. Therefore, the torque of the intermediate shaft 21 is transmitted to the output shaft 26 through the gears 25 and 27 prior to being outputted. Due to the above structure, the speed changing device converts its operational mode between three modes. However, the operational mode of the speed changing device may be converted between four modes. In order to give four modes to the device, an eleventh gear 18 with a fourth clutch 17 is rotatably fitted over the above driven gear 7 between the second and third clutches 16 and 19. The fourth clutch 17 selectively clutches the gear 18 to rotate the gear 18 along with the shaft 7. In addition, a twelfth gear 23 is fixedly fitted over the intermediate shaft 21. The twelfth gear 23 gears into the eleventh gear 18 of the driven shaft 7.

The operational effect of the above stepless speed changing device will be described hereinbelow.

Once the second clutch 9 is operated to clutch the third and fourth gears 8 and 10, the speed changing device enters into its first mode.

In the first mode, the speed changing device transmits the input torque of the input shaft 1 through first gear 2→third gear 8→second clutch 9→fourth gear 10→planetary gear carrier 11→planetary gear 12→sun gear 13→driven shaft 7→second sprocket 16→chain (not shown)→first sprocket 5→stepless speed changing unit 6. At the above speed changing unit 6, the torque returns to the input shaft 1. In this first mode, the planetary gear 12 of the summarizer transmits the torque to both the sun gear 13 and the ring gear 14. The torque of the ring gear 14 in turn is transmitted to the output shaft 26 through the fifth gear 15→seventh gear 22→intermediate shaft 21→ninth gear 25→tenth gear 27 of the output shaft 26. The torque is outputted from the output shaft 26.

Both the gear ratio of the first and third gears 2 and 8 and the gear ratio of the summarizer are determined to make the changed rotating speed be no higher than zero at a time the speed change ratio of the speed changing unit 6 increases the rotating speed to the maximum. When the reduction gear ratio of the unit 6 in the above state is increased to reduce the output speed of the unit 6, the rotating speed of the sun gear 13 is reduced. However, the rotating speed of the intermediate shaft 21 in the above state is increased. When the stepless speed change ratio of the unit 6 is at the maximum ratio, the maximum speed in the first mode is achieved. In the above state, the rotating speed of the driven shaft 7 is equal to that of the ring gear 14 of the summarizer's epicycloidal gear train. That is, the driven shaft 7 and the ring gear 14 have a synchronous speed. Even though the third clutch 19 in the above state clutches the sixth gear 20, there is no problem in the power transmitting operation of the device as the gear ratio of the fifth and seventh gears 15 and 22 is equal to that of the sixth and eighth gears 20 and 24.

When operating the third clutch 19 to clutch the sixth gear 20 while stopping the second clutch 9 at the synchronous speed condition in the above first mode, the operational mode of the speed changing device is converted into the second mode. In the above second mode, the torque of the input shaft 1 is transmitted to the shafts 7 and 21 through the speed changing unit 6 instead of the epicycloidal gear train of the summarizer. That is, the torque of the input shaft 1 is transmitted to the driven shaft 7 through the first and second sprockets 5 and 16. The torque of the driven shaft 7 in turn is transmitted to the intermediate shaft 21 through the clutch 19 and gears 20 and 24. The torque of the intermediate shaft 21 in the second mode is, thereafter, transmitted to the output shaft 26 through the gears 25 and 27 prior to being outputted. When the reduction gear ratio of the unit 6 in the second mode is reduced, the rotating speed of the output shaft 26 is increased. When the stepless speed change ratio is at the maximum speed increasing ratio, the speed changing device achieves the maximum speed in the second mode. In the above state, the input shaft 1 and the second gear 4 have a synchronous speed. When operating the first clutch 3 to clutch the second gear 4 while stopping the third clutch 19 in the above state, the operational mode of the speed changing device is converted into the third mode from the second mode. In the above third mode, the torque of the input shaft 1 is transmitted to the output shaft 26 through summarizer→fifth gear 15→seventh gear 22→intermediate shaft 21→ninth gear 25→tenth gear 27. In order to achieve the above synchronous speed, the gear ratio of the second and fourth gears 4 and 10 is set to cause the rotating speed of the second gear 4 at the maximum speed condition in the second mode to be equal to that of the input shaft 1.

When operating the fourth clutch 17 to clutch the eleventh gear 18 while stopping the first clutch 3 at the synchronous speed condition in the third mode, the speed changing device enters into the fourth mode. In the above fourth mode, the torque of the input shaft 1 is transmitted to the output shaft 26 through the speed changing unit 6→fourth clutch 17→eleventh gear 18→twelfth gear 23→intermediate shaft 21→ninth gear 25→tenth gear 27. When the speed changing unit 6 in the third mode has the maximum reduction gear ratio, the rotating speed of the driven shaft 7 is different from that of the intermediate shaft 21. In this regard, the mode conversion into the fourth mode can be achieved by setting the rotating speed of the intermediate shaft 21 at the maximum reduction gear ratio condition of the unit 6 in the third mode to be equal to the rotating speed of the intermediate shaft 21 that is rotated by the torque transmitted from the unit 6 through the shaft 7 and gears 18 and 23. In order to prevent an excessive increase of the maximum speed and an excessive increase of the gear ratio of the gears 18 and 23 in the above state, the timing of mode conversion into the fourth mode may be set at an appropriate reduction gear ratio instead of the maximum reduction gear ratio of the unit 6. The reduction gear ratio suitable to convert the operational mode of the device may be achieved by adjusting the gear ratio of the gears 18 and 23. In the above appropriate reduction gear ratio of the unit 6, there is no problem in the power transmitting operation even though both clutches 3 and 17 are operated at the same time.

In order to transmit the torque while reducing the rotating speed, the clutches are operated in inverted order. The above speed changing device continuously transmits the torque of an input shaft without any intermission while changing the rotating speed between the minimum speed of not higher than zero and the maximum speed. When the minimum speed in the first mode is set as zero, the device with a reverse gear smoothly converts its operational mode between reverse and forward drive modes at the zero speed condition. The rotating speed in the reverse drive mode may be increased or reduced in the same manner as described for the forward drive mode. The above speed changing device also may achieve the reverse drive mode in the first mode without having any reverse rotating mechanism. In this case, the gear ratio of the gears 2 and 8 and the gear ratio of the gears 4 and 10 and the gear ratio of the sun and ring gears 13 and 14 of the summarizer must be appropriately adjusted.

As described above, the present invention provides a stepless speed changing device that converts its operational mode between three or four modes. This invention thus reduces the load applied to both the stepless speed changing unit and the summarizer thus reducing the size of the stepless speed changing device.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A stepless speed changing device having a stepless speed changing unit and a summarizer and converting its operational mode by a clutching motion in a synchronous speed condition to transmit input torque to an output shaft while changing a rotating speed, the device comprising:

first and second gears fixedly and rotatably fitted over a torque input shaft, respectively, said second gear being selectively clutched to said input shaft by a first clutch to convert the operational mode into a third mode;

third and fourth gears rotatably fitted over a driven shaft and meshing with said first and second gears respectively to form a pair of gear sets having different gear ratios, both said third and fourth gears being selectively clutched by a second clutch to convert the operational mode into a first mode;

the stepless speed changing unit mounted to the input shaft and connected to the summarizer by power transmission means;

the summarizer mounted to said driven shaft and constructed of an epicycloidal gear train, said gear train including:

a planetary gear carrier fixed to said fourth gear and carrying a planetary gear;

a sun gear fixedly fitted over the driven shaft and gearing into said planetary gear;

a ring gear meshing with said planetary gear; and a fifth gear rotatably fitted over the driven shaft and fixed to said ring gear;

a sixth gear rotatably fitted over said driven shaft, said sixth gear being selectively clutched by a third clutch to convert the operational mode into a second mode; and seventh, eight and ninth gears fixedly fitted over an intermediate shaft, said seventh and eight gears meshing with said fifth and sixth gears of the driven shaft, respectively, while said ninth gear meshing with a tenth gear of said output shaft.

2. The stepless speed changing device according to claim 1, wherein said power transmission means comprises:

a first sprocket rotatably fitted over said input shaft and fixed to an output part of the stepless speed changing unit; and a second sprocket fixedly fitted over said driven shaft.

3. The stepless speed changing device according to claim 1, further comprising:

an eleventh gear rotatably fitted over said driven shaft, said eleventh gear being to said driven shaft by a fourth clutch to convert the operational mode into a fourth mode; and a twelfth gear fixedly fitted over the intermediate shaft, said twelfth gear meshing with the eleventh gear.

* * * * *